United States Patent
Jung et al.

(10) Patent No.: US 11,610,283 B2
(45) Date of Patent: Mar. 21, 2023

(54) APPARATUS AND METHOD FOR PERFORMING SCALABLE VIDEO DECODING

(71) Applicant: AGENCY FOR DEFENSE DEVELOPMENT, Daejeon (KR)

(72) Inventors: Ju Hyun Jung, Daejeon (KR); Dong Hyun Kim, Daejeon (KR); No Hyeok Park, Daejeon (KR); Jeung Won Choi, Daejeon (KR); Dae Eun Kim, Daejeon (KR); Se Hwan Ki, Daejeon (KR); Mun Churl Kim, Daejeon (KR); Ki Nam Jun, Gyeonggi-do (KR); Seung Ho Baek, Gyeonggi-do (KR); Jong Hwan Ko, Daejeon (KR)

(73) Assignee: AGENCY FOR DEFENSE DEVELOPMENT, Daejeon (KR)

(*) Notice: Subject to any disclaimer, the term of this patent is extended or adjusted under 35 U.S.C. 154(b) by 356 days.

(21) Appl. No.: 16/831,805

(22) Filed: Mar. 27, 2020

(65) Prior Publication Data
US 2020/0311870 A1 Oct. 1, 2020

(30) Foreign Application Priority Data

Mar. 28, 2019 (KR) .................... 10-2019-0036208

(51) Int. Cl.
| | |
|---|---|
| *G06T 3/40* | (2006.01) |
| *G06N 3/04* | (2006.01) |
| *H04N 19/59* | (2014.01) |
| *G06N 3/08* | (2023.01) |

(Continued)

(52) U.S. Cl.
CPC ............. *G06T 3/4046* (2013.01); *G06N 3/04* (2013.01); *G06N 3/08* (2013.01); *G06T 9/002* (2013.01); *H04N 19/33* (2014.11); *H04N 19/59* (2014.11); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 10,499,069 | B2 * | 12/2019 | Wang | .................... G06T 3/4053 |
| 10,805,634 | B2 | 10/2020 | Kapoor et al. | |
| 10,991,076 | B2 * | 4/2021 | Huang | .................... G06T 5/001 |

(Continued)

FOREIGN PATENT DOCUMENTS

KR 10-2018-0126362 11/2018

OTHER PUBLICATIONS

Office Action dated Dec. 3, 2020 for Korean Patent Application No. 10-2019-0036208 and its English translation provided by Applicant's foreign counsel.

(Continued)

*Primary Examiner* — Joni Hsu
(74) *Attorney, Agent, or Firm* — Ladas & Parry, LLP (57) ABSTRACT

Provided are a method and an apparatus for performing scalable video decoding, wherein the method and the apparatus down-sample input video, determine the down-sampled input video as base layer video, generate prediction video for enhancement layer video by applying an up-scaling filter to the base layer video, and code the base layer video and the prediction video, wherein the up-scaling filter is a convolution filter of a deep neural network.

13 Claims, 4 Drawing Sheets

(51) Int. Cl.
*G06T 9/00* (2006.01)
*H04N 19/33* (2014.01)

(56) References Cited

U.S. PATENT DOCUMENTS

| | | | | |
|---|---|---|---|---|
| 2004/0184657 | A1* | 9/2004 | Lin | G06T 3/4007 |
| | | | | 382/159 |
| 2005/0069195 | A1* | 3/2005 | Uezono | G01C 11/06 |
| | | | | 382/154 |
| 2012/0038828 | A1* | 2/2012 | Choi | H04N 9/67 |
| | | | | 348/E9.035 |
| 2015/0304686 | A1* | 10/2015 | Thiagarajan | H04N 19/117 |
| | | | | 375/240.13 |
| 2016/0014411 | A1* | 1/2016 | Sychev | H04N 19/82 |
| | | | | 375/240.12 |
| 2016/0156913 | A1* | 6/2016 | Lee | H04N 19/44 |
| | | | | 375/240.02 |
| 2018/0124414 | A1 | 5/2018 | Van Leuven et al. | |
| 2020/0234402 | A1* | 7/2020 | Schwartz | G06T 3/4015 |
| 2021/0166350 | A1* | 6/2021 | Wang | G06T 3/4053 |

OTHER PUBLICATIONS

Dae-Eun Kim et al.: "Scalable Video Coding using Super-Resolution based on Convolutional Neutral Networks for Video Transmission over Very Narrow-Bandwidth Networks", Jan. 2019, pp. 132-139 (English machine translation by Google Translate).
Wenzhe Shi et at.: "Real-Time Single Image and Video Super-Resolution Using an Efficient Sub-Pixel Convolutional Neutral Network", Cornell University arxiv: 1609.05158. Sep. 23, 2016, pp. 1-10.

\* cited by examiner

APPARATUS AND METHOD FOR PERFORMING SCALABLE VIDEO DECODING

CROSS-REFERENCE TO RELATED APPLICATION

This application claims the benefit of Korean Patent Application No. 10-2019-0036208, filed on Mar. 28, 2019, in the Korean Intellectual Property Office, the disclosure of which is incorporated herein in its entirety by reference.

BACKGROUND

1. Field

One or more embodiments relate to an apparatus and a method for performing scalable video decoding

2. Description of Related Art

Scalable coding refers to a coding technique that allows videos of various qualities to be decoded with only one-time coding. For example, scalable coding is a technique that may service 4K UHD video with resolution and frame rate of 3840×2160 @ 60 frame per second (fps), respectively, at various spatial resolutions (spatial scalability) and various frame rates (temporal scalability) such as 1920×1080 @ 60 fps, 1920×1080 @ 60 fps, 3840×2160 @ 30 fps, and the like according to service environments, and may also code and service even video with the same resolution and fame rate of 3840×2160 @ 60 fps in different qualities (quality scalability). Spatial scalability scalable video coding supports an inter-layer prediction that uses a coding result of a base layer as prediction video of an enhancement layer to enhance coding efficiency of the enhancement layer. In other words, reconstruction frames acquired by coding 1920×1080 @ 60 fps video are used as prediction video to code 3840×2160 @ 60 fps video. Here, an up-scaling filter that matches a low spatial resolution of the base layer to a high spatial resolution of the enhancement layer is needed. Existing scalable high efficiency video coding (SHVC) standard uses an up-scaling filter with eight coefficients for a luminance component and four coefficients for chrominance components, i.e., with fixed filter size and coefficient values. Since the up-scaling filter with the fixed filter size and coefficient values described above up-scales a base layer and uses the up-scaled result as prediction video of an enhancement layer, the up-scaling filter has a limit thereof in consideration of a performance of up-scaling affecting entire coding efficiency. Also, efficiency of entire scalable coding may be further enhanced by enhancing a performance of the up-scaling filter.

Therefore, there is a need for a technique capable of enhancing a performance of an up-scaling filter.

SUMMARY

One or more embodiments include an apparatus and a method for performing scalable video decoding. One or more embodiments include a computer-readable recording medium recording thereon a program for executing the method in a computer. The technical problems to be achieved by the present embodiments are not limited to the technical problems as described above, and other technical problems may be inferred from the following embodiments.

Additional aspects will be set forth in part in the description which follows and, in part, will be apparent from the description, or may be learned by practice of the presented embodiments of the disclosure.

According to one or more embodiments, a method of performing scalable video decoding, includes: down-sampling input video and determining the down-sampled input video as base layer video; generating prediction video for enhancement layer video by applying an up-scaling filter to the base layer video; and coding the base layer video and the prediction video, wherein the up-scaling filter is a convolution filter of a deep neural network.

The method may further include generating the prediction video for the enhancement layer video by selectively applying a fixed up-scaling filter and the convolution filter of the deep neural network to the base layer video.

The method may further include generating the prediction video for the enhancement layer video by applying a bi-cubic interpolation to a chrominance component of the base layer video and applying the convolution filter of the deep neural network to a luminance component of the base layer video.

The deep neural network may be a deep neural network trained on the basis of a difference between video scaled up from low-resolution luminance input video and high-resolution original video.

The deep neural network may include a plurality of residual blocks in which two convolution layers and two activation functions are alternately connected.

The deep neural network may include a pixel shuffle layer.

The activation functions may include leaky rectified linear units (LReLUs).

According to one or more embodiments, an apparatus for performing scalable video decoding, includes a controller configured to down-sample input video, determine the down-sampled input video as base layer video, generate prediction video for enhancement layer video by applying an up-scaling filter to the base layer video, and code the base layer video and the prediction video, wherein the up-scaling filter is a convolution filter of a deep neural network.

The controller may generate the prediction video for the enhancement layer video by selectively applying a fixed up-scaling filter and the convolution filter of the deep neural network to the base layer video.

The controller may generate the prediction video for the enhancement layer video by applying a bi-cubic interpolation to a chrominance component of the base layer video and applying the convolution filter of the deep neural network to a luminance component of the base layer video.

The deep neural network may be a deep neural network trained on the basis of a difference between video scaled up from low-resolution luminance input video and high-resolution original video.

The deep neural network may include a plurality of residual blocks in which two convolution layers and two activation functions are alternately connected.

The deep neural network may include a pixel shuffle layer.

The activation functions may include leaky rectified linear units (LReLUs).

According to one or more embodiments, a computer-readable recording medium records thereon a program for executing the method in a computer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As used herein, the wording "in some embodiments" or "in an embodiment," appearing in various places do not necessarily refer to the same embodiment.

Some embodiments of the disclosure may be represented by functional block components and various processing steps. Some or all of these functional blocks may be embodied as various numbers of hardware and/or software components that perform particular functions. For example, the functional blocks of the discourse may be embodied by one or more processors or may be embodied by circuit components for preset functions. Also, for example, the functional blocks of the disclosure may be embodied in various types of programming or scripting languages. The functional blocks may be embodied with an algorithm executed on one or more processors. Also, the disclosure may employ existing techniques for electronic environment setting, signal processing, and/or data processing, and the like. The terms "mechanism," "element," "means, "component," etc. may be widely used and are not limited to mechanical and physical components. Also, the terms " . . . part," " . . . module," etc. described herein refers to a unit that processes at least one function or operation and may be embodied as hardware, software, or a combination of hardware and software.

In addition, connection lines or connection members between components illustrated in the drawings are merely illustrative of functional connections and/or physical or circuit connections. In a real apparatus, connections between components may be indicated by various functional connections, physical connections, or circuit connections that are replaceable or added.

Embodiments will now be described in detail with reference to the accompanying drawings.

Figure 1:
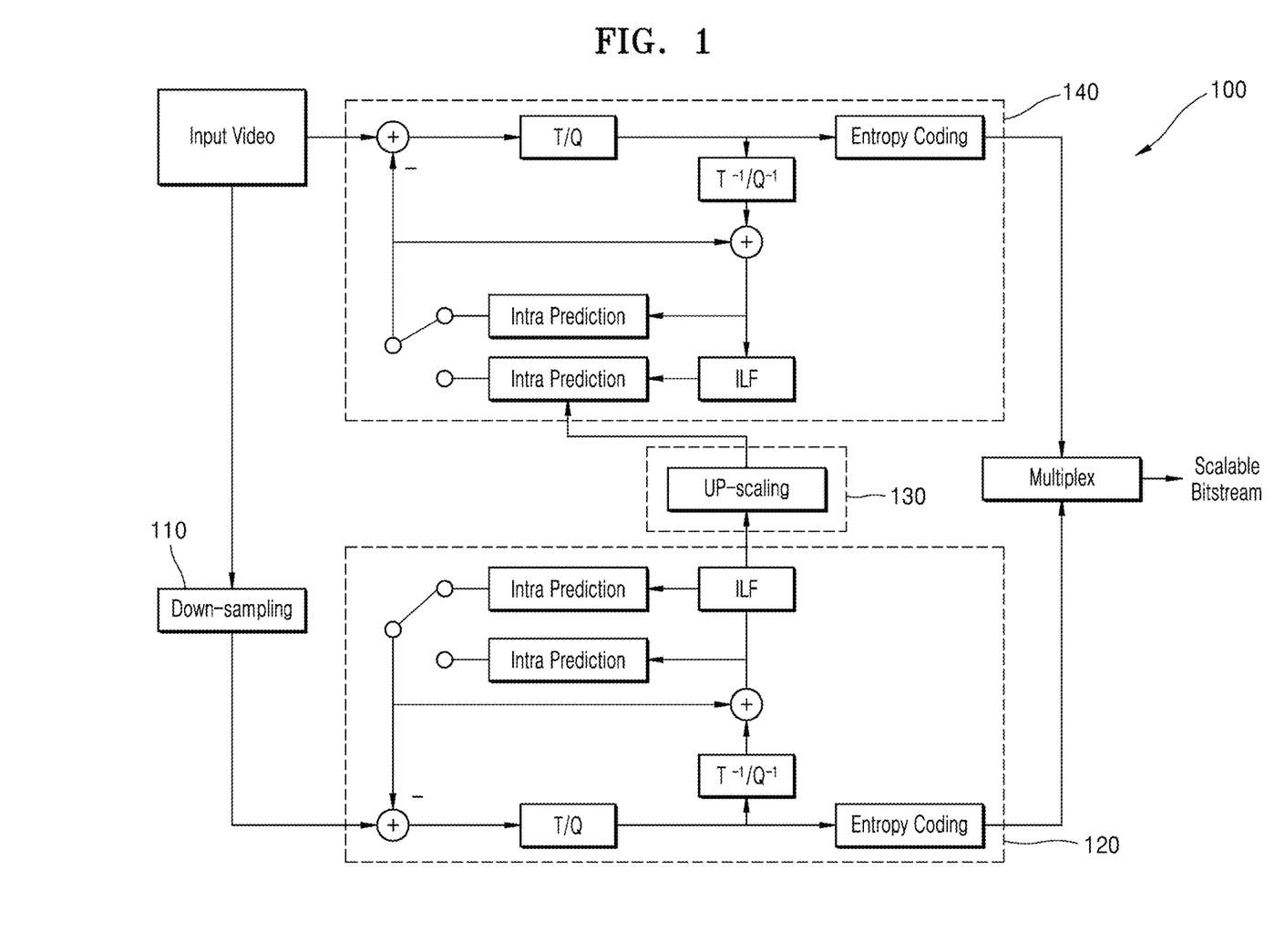
FIG. 1 is a view illustrating a structure of a scalable video coding apparatus according to an embodiment.

FIG. 1 is a view illustrating a structure of a scalable video coding apparatus according to an embodiment.

Referring to FIG. 1, a scalable video coding apparatus 100 may include a down-sampling unit 110, a base layer video processor 120, an up-scaling filter 130, and a prediction video generator 140.

The down-sampling unit 110 performs down-sampling on input video to adjust quality of the input video. The down-sampling unit 110 may use various types of down samples according to which scalability the scalable video coding apparatus 100 uses to code original video.

For example, the down-sampling unit 110 may lower a resolution of a screen by sub-sampling frames of the input video in a horizontal direction and a vertical direction. Alternatively, the down-sampling unit 110 may lower a frame rate of the input video by removing some frames of the frames constructing the input video. Alternatively, the down-sampling unit 110 may reduce a bit depth, such as changing a bit depth of pixels constructing the input video from 8 bits to 6 bits.

Alternatively, the down-sampling unit 110 may also convert a video format, and when the input video is in 4:4:4 video format, may convert the input video into 4:2:2 or 4:2:0 video format by performing down-sampling on a chrominance block. Here, the 4:4:4 video format means that three components, i.e., a luminance component Y and chrominance components Cb and Cr, respectively exist in all pixel positions, the 4:2:2 video format means that the chrominance components Cb and Cr have the same resolution as the luminance component Y in a horizontal direction but have a resolution of ½ of the luminance component Y in a vertical direction, and the 4:2:0 video format means that the chrominance components Cb and Cr have a resolution of ½ of the luminance component Y in the horizontal and vertical directions.

However, a function of the down-sampling unit 110 according to the present embodiment is not limited to the methods listed above.

The base layer video processor 120 generates a base layer bitstream by coding the input video down-sampled by the down-sampling unit 110 through prediction coding, motion compensation, orthogonal transform, quantization, entropy coding, and the like and generates base layer reconstruction video by decoding the generated base layer bitstream.

To perform coding for generating the base layer bitstream, the base layer video processor 120 may use any one codec of H.264 baseline profile, H.264 main profile, VC-1 simple profile, VC-1 advanced profile, MPEG-4 part 2 simple profile, MPEG-4 part 2 advanced simple profile, MPEG4 part 2 main profile, H.263 baseline profile, and the like that are compatible with existing video compression standards.

The up-scaling filter 130 generates up-scaled reconstruction video by performing up-scaling that is an opposite process to a process performed by the down-sampling unit 110, on the base layer reconstruction video generated by the base layer video processor 120.

For example, when a resolution of video is lowered by the down-sampling unit 110, the up-scaling filter 130 may enhance a resolution of reconstruction video using an interpolation for the reconstruction video.

Alternatively, when a frame rate is lowered by the down-sampling unit 110, the up-scaling filter 130 may generate new frames using frames of the reconstruction video and then interpolate the generated frames into the frames of the reconstruction video to enhance a frame rate of the reconstruction video.

Alternatively, when a video format of the input video is converted by the down-sampling unit 110, the up-scaling filter 130 may convert a video format of the reconstruction video to match a video format of original video.

Alternatively, when a bit depth is reduced by the down-sampling unit 110, the up-scaling filter 130 may reconstruct the bit depth again.

However, a function of the up-scaling filter 130 according to the present embodiment is not limited to the methods listed above.

In an embodiment, the up-scaling filter 130 may include a filter with fixed filter size and coefficient values. For example, in scalable high efficiency video coding (SHVC) standard, a fixed up-scaling filter with eight coefficients for a luminance component and four coefficients for chrominance components may be used.

In another embodiment, the up-scaling filter 130 may include a deep neural network convolution filter. Alternatively, the up-scaling filter 130 may include both the deep neural network convolution filter and the fixed up-scaling filter. The deep neural network convolution filter will be described below with reference to FIG. 3.

Prediction video for enhancement layer video may be generated by applying the up-scaling filter 130 to base layer video.

The prediction video generator 140 may generate the prediction video by performing prediction on the base layer video to which the up-scaling filter 130 is applied.

The prediction video generator 140 may generate the prediction video for the enhancement layer video by applying at least one selected from the fixed up-scaling filter and the deep neural network convolution filter to the base layer video.

According to one or more embodiments, instead of generating the prediction video using merely the fixed up-scaling filter as the up-scaling filter 130, the prediction video may be generated additionally using the deep neural network convolution filter, thereby enhancing an inter-layer prediction performance and further enhancing coding efficiency of the scalable video coding apparatus 100.

In an embodiment, after training a plurality of deep neural networks according to characteristics (compression and distortion degrees, and the like) of base layer video, prediction video may also be generated using a convolution filter appropriate for input video among respective convolution filters of the plurality of trained deep neural networks.

The down-sampling unit 110, the base layer video processor 120, the up-scaling filter 130, and the prediction video generator 140 of the scalable video coding apparatus 100 may be embodied by one processor or may be embodied by a plurality of processors.

Also, the scalable video coding apparatus 100 may further include a memory. The memory is hardware that stores various types of pieces of data processed in the scalable video coding apparatus 100. The memory may store applications, drivers, and the like to be driven by the scalable video coding apparatus 100. The memory may include random access memory (RAM), such as dynamic random access memory (DRAM), static random access memory (SRAM), or the like, read-only memory (ROM), electrically erasable programmable read-only memory (EEPROM), CD-ROM, Blu-ray, other optical disk storages, a hard disk drive (HDD), a solid state drive (SSD), or flash memory.

Figure 2:
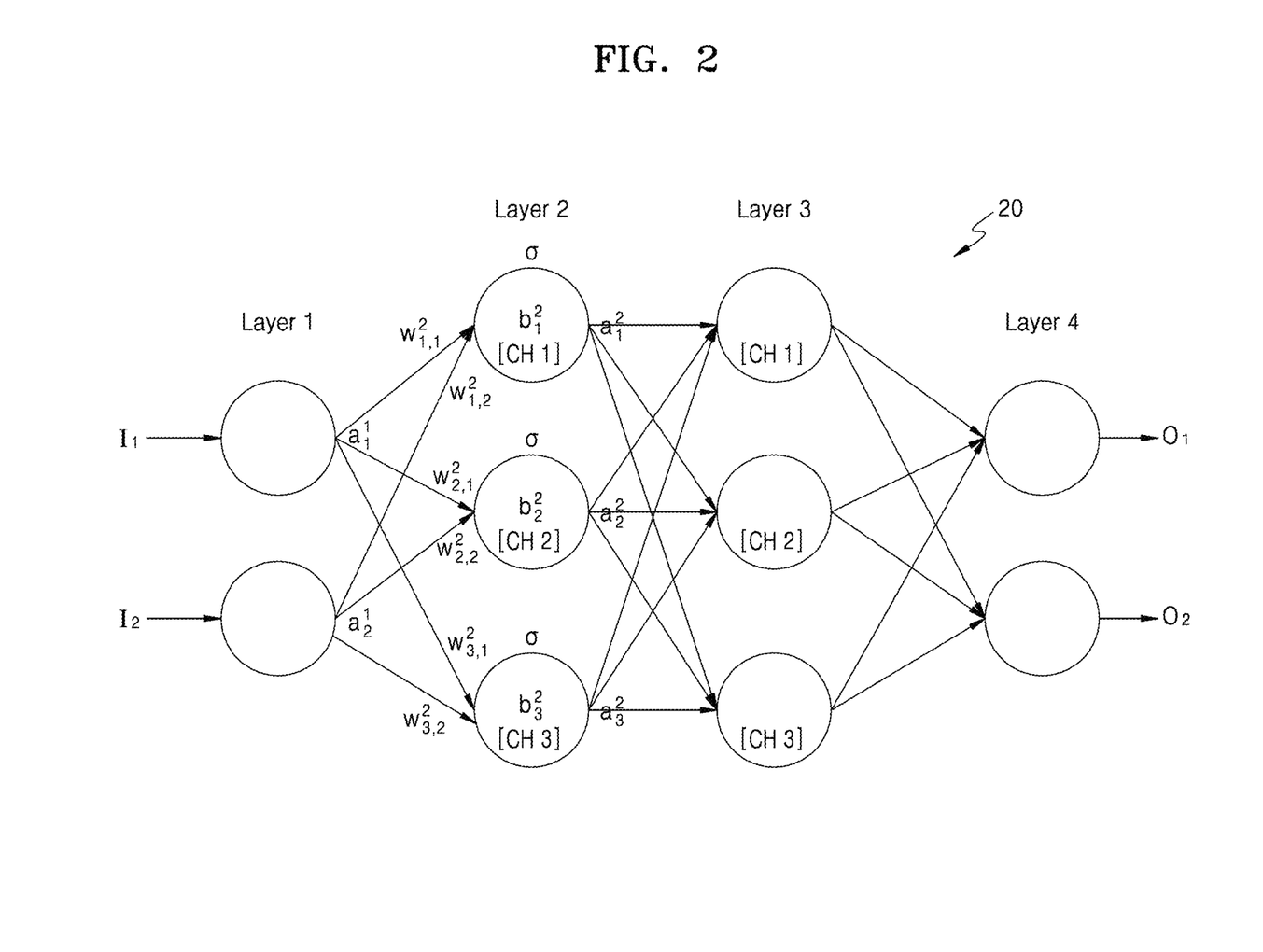
FIG. 2 is a view illustrating a computation performed in a deep neural network (hereinafter referred to as a DNN), according to an embodiment.

FIG. 2 is a view illustrating a computation performed in a deep neural network (hereinafter referred to as a DNN), according to an embodiment.

Referring to FIG. 2, a DNN 20 may have a structure including an input layer, hidden layers, and an output layer, perform a computation on the basis of received input data (e.g., $I_1$ and $I_2$), and generate output data (e.g., $O_1$ and $O_2$) on the basis of the performance result.

For example, as shown in FIG. 2, the DNN 20 may include an input layer Layer 1, two hidden layers Layer 2 and Layer 3, and an output layer Layer 4. Since, the DNN 20 includes more layers capable of processing valid information, the DNN 20 may process more complex data sets than a neural network having a single layer. The DNN 20 is illustrated as including four layers, but this is merely an example, and thus the DNN 20 may include fewer or more layers or may include fewer or more channels. In other words, the DNN 20 may include layers having various structures different from those illustrated in FIG. 2.

Each of layers included in the DNN 20 may include a plurality of channels. The channels may correspond to a plurality of artificial nodes known as neurons, processing elements (PEs), units, or terms similar thereto. For example, as shown in FIG. 2, the input layer Layer 1 may include two channels (nodes), and each of the hidden layers Layer 2 and Layer 3 may include three channels. However, this is merely an example, and thus each of layers included in the DNN 20 may include various numbers of channels (nodes).

Channels included in each of the layers of the DNN 20 may be connected to each other to process data. For example, one channel may receive data from other channels, perform a computation on the basis of the received data, and output the computation result to the other channels.

An input and an output of each of channels may be respectively referred to as an input activation and an output activation. In other words, an activation may be a parameter corresponding to an input of channels included in a next layer, at the same time as an output of one channel. Each of channels may determine an activation thereof on the basis of activations and weights received from channels included in a previous layer. A weight may be a parameter used to calculate an output activation in each channel and may be a value allocated to a connection relationship between channels.

Each of channels may be processed by a computational unit or a processing element that receives an input and outputs an output activation, and an input and an output of each of the channels may be mapped. For example, when $\sigma$ is an activation function, $w_{jk}^{i}$ is a weight from a $k^{th}$ channel included in an $i-1^{th}$ layer to a $j^{th}$ channel included in an $i^{th}$ layer, $b_j^i$ is bias of the $j^{th}$ channel included in the $i^{th}$ layer, and $a_j^i$ is an activation of the $j^{th}$ channel included in the $i^{th}$ layer, the activation $a_j^i$ may be calculated using Equation 1 below.

$$a_j^i = \sigma\left(\sum_k (w_{jk}^i \times a_k^{i-1}) + b_j^i\right) \quad (1)$$

As shown in FIG. 2, an activation of a first channel CH1 of a second layer, i.e., the hidden layer Layer 2, may be expressed as $a_1^2$. Also, $a_1^2$ may have a value of $a_1^2 = \sigma(w_{1,1}^2 \times a_1^1 + w_{1,2}^2 \times a_2^1 + b_1^2)$ according to Equation 1. However, Equation 1 described above is merely an example for describing an activation and a weight used for processing data in the DNN 20, and thus the embodiments are not limited thereto. An activation may be a value acquired by enabling a value, acquired by applying an activation function to a sum of activations received from a previous layer, to pass through a rectified linear unit (ReLU).

In an embodiment, the DNN 20 may determine a factor defining a relationship between a descriptor and a property, through learning using the descriptor and a property value. In other words, among Layer 1 through Layer 4 constructing the DNN 20, the descriptor may be the input layer Layer 1, the property value may be the output layer Layer 4, and the factor may be at least one selected from the hidden layers Layer 2 and/or Layer 3.

In the DNN 20, an input layer may perform a computation using a descriptor as input data and generate a property value as output data on the basis of the computation performance result.

Figure 3:
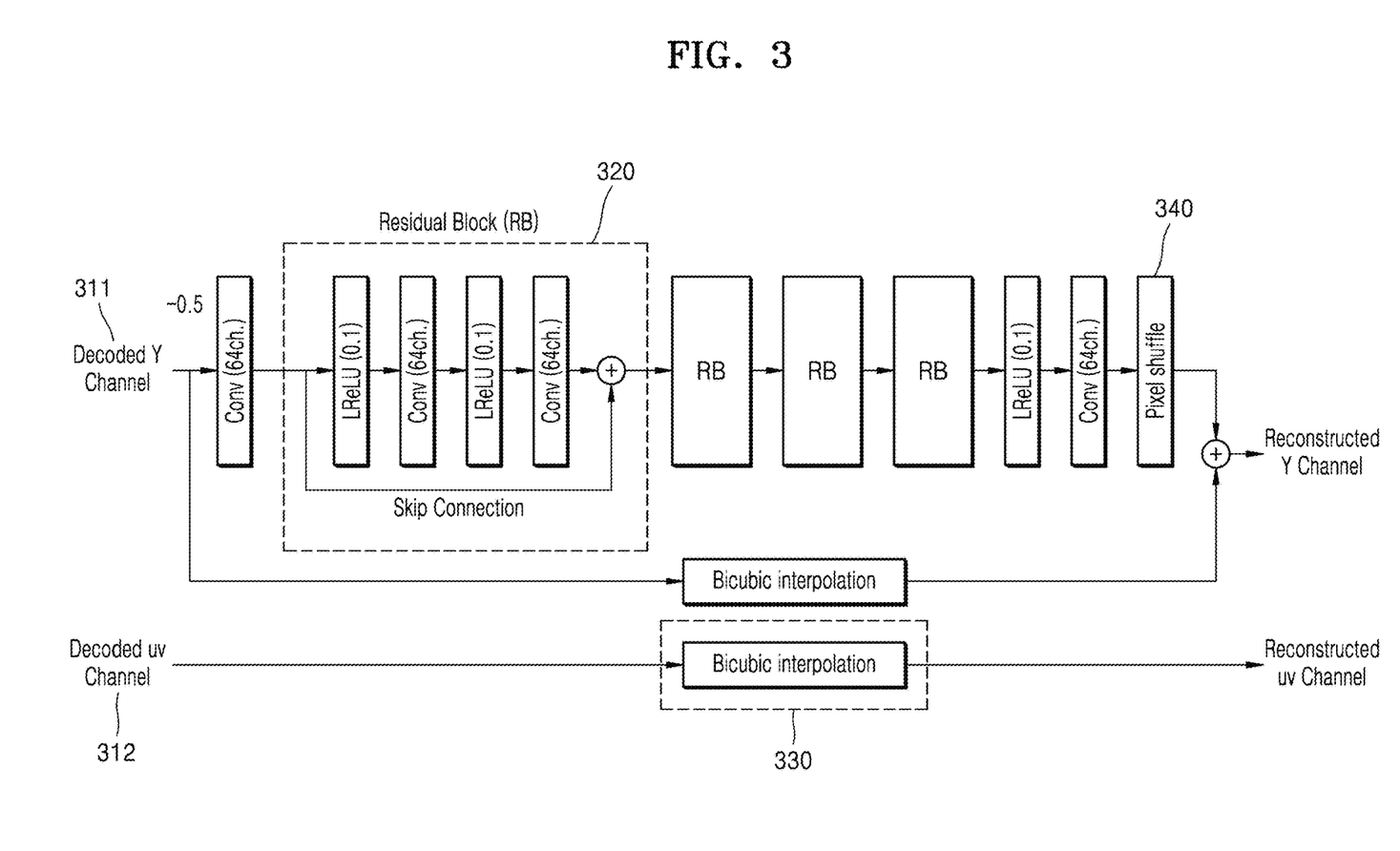
FIG. 3 is a view illustrating an example of a DNN-based super-resolution algorithm, according to an embodiment.

FIG. 3 is a view illustrating an example of a deep neural network-based super-resolution algorithm according to an embodiment.

In an embodiment, a scalable video coding apparatus may apply a bi-cubic interpolation 330 to a chrominance component 312 of base layer video to enhance a resolution.

The scalable video coding apparatus may apply a convolution filter of a deep neural network to a luminance component 311 of the base layer video to enhance the resolution. The deep neural network may be trained on the basis of a difference between video scaled up from low-resolution luminance input video and high-resolution original video.

The deep neural network may include a plurality of residual blocks 320 using a skip connection structure in which two convolution layers and two activation functions are alternately connected. For example, four residual blocks 320 may be connected in series.

Also, a computation amount may be reduced by applying a pixel shuffle layer 340 to the deep neural network. An activation function applied to the deep neural network may be a leaky rectified linear unit (LReLU) but is not limited thereto.

The scalable video coding apparatus may also enhance the resolution by applying the convolution filter of the deep neural network and the bi-cubic interpolation 330 to the luminance component 311 of the base layer video.

The resolution may be enhanced by applying the convolution filter of the deep neural network to other components other than the luminance component 311 of the base layer video.

Figure 4:
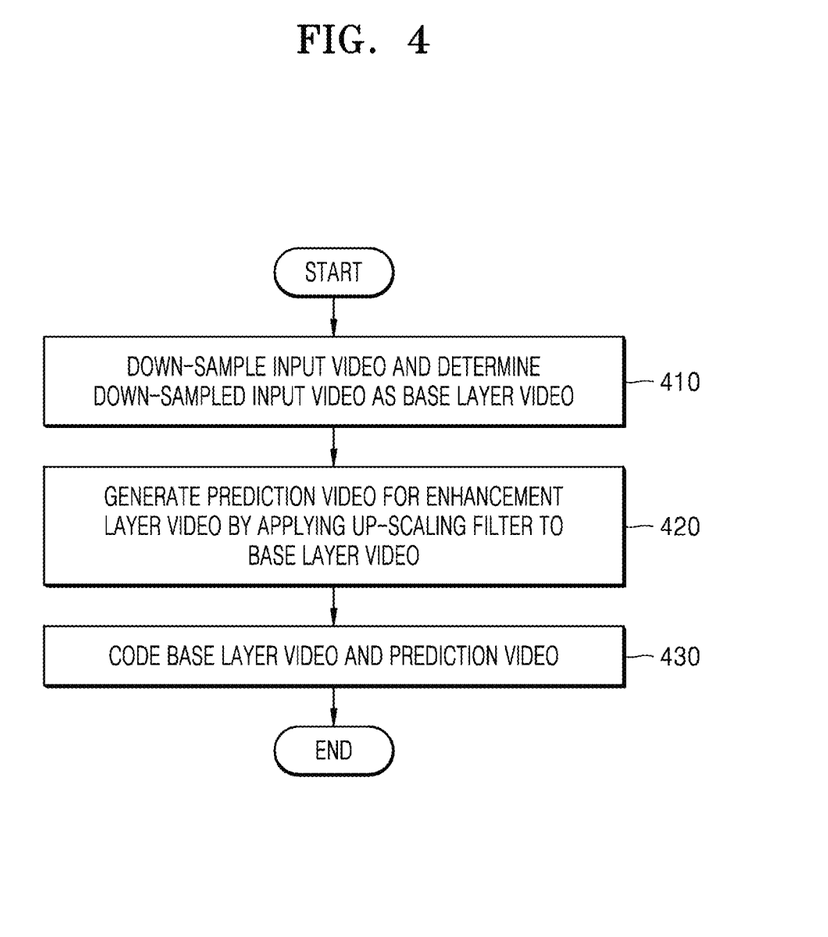
FIG. 4 is a flowchart illustrating a method of performing scalable video decoding, according to an embodiment.

FIG. 4 is a flowchart illustrating a method of performing scalable video decoding, according to an embodiment.

Referring to FIG. 4, in operation 410, a scalable video coding apparatus may down-sample input video.

The scalable video coding apparatus may use various types of down samples according to which scalability is used to code original video. In an embodiment, the scalable video coding apparatus may down-sample the input video to lower a spatial resolution of the input video.

In operation 420, the scalable video coding apparatus may generate prediction video for enhancement layer video by applying an up-scaling filter to base layer video.

The up-scaling filter may include at least one selected from a deep neural network convolution filter and a fixed up-scaling filter.

In an embodiment, the scalable video coding apparatus may enhance an inter-layer prediction performance by generating the prediction video additionally using the deep neural network convolution filter instead of generating the prediction video using merely the fixed up-scaling filter. In this case, coding efficiency of the scalable video coding apparatus may be enhanced.

In operation 430, the scalable video coding apparatus may code the base layer video and the prediction video.

The scalable video coding apparatus may generate a bitstream for the base layer video and a bitstream for the prediction video by performing coding. The bitstream for the base layer video and the bitstream for the prediction video may be integrated.

The present embodiments may be embodied in the form of applications stored on an electronic device-readable recording medium storing instructions and data executable by an electronic device. The instructions may be stored in the form of program code, and when being executed by a processor, may generate a preset program module to perform a preset operation. Also, when being executed by a processor, the instructions may perform preset operations of the embodiments.

The embodiments may also be embodied in the form of a recording medium including instructions executable by a computer, such as a program module executed by the computer. Computer-readable media may be any available media that may be accessed by a computer and include all of volatile and nonvolatile media, and removable and non-removable media. The computer-readable media may also include all of computer storage media and communication media. The computer storage media include all of volatile, nonvolatile, removable, and non-removable media that are embodied by any methods or techniques for storing computer-readable instructions, data structures, program modules, or information such as other types of data. The communication media include computer-readable instructions, data structures, other data of modulated data signals such as program modules, or other transmission mechanisms and include any information transmission media.

Also, as used herein, a "part" may be a hardware component such as a processor or a circuit and/or a software component executed by a hardware component such as a processor.

The above description of the embodiments is for an example, and thus one of ordinary skill in the art may understand that the above description may be easily changed into other detailed forms without changing the spirit and essential features of the embodiments. Therefore, the embodiments described above should be understood to be illustrative in all aspects and not restrictive. For example, each element described in a single form may be implemented in a distributed manner, and similarly, elements described as being distributed may also be implemented in a combined form.

The scope of the embodiments is represented by the scope of claims, which will be described below, rather than by the detailed description, and should be construed as including all changes or modifications derived from the concept and scope of claims and equivalent concepts thereof.

According to one or more embodiments, an inter-layer prediction performance of a scalable video coder may be enhanced using a deep neural network-based super-resolution to enhance a coding performance. According to one or more embodiments, at the same bandwidth, higher quality video may be transmitted than an existing scalable video coder. In contrast, a narrower bandwidth may be used to transmit the same quality video, compared to the existing scalable video coder.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of performing scalable video decoding, the method comprising:

generating base layer video by down-sampling input video;

generating prediction video for enhancement layer video by selectively applying a fixed up-scaling filter, which has fixed filter coefficient values, and a convolution filter of a deep neural network to the base layer video; and coding the base layer video and the prediction video, wherein the generating of the prediction video for the enhancement layer video comprises generating the prediction video for the enhancement layer video by applying one convolution filter corresponding to a compression and distortion degree of the generated base layer video to the base layer video among a plurality of convolution filters of a plurality of deep neural networks which are pre-trained according to a plurality of compression and distortion degrees.

2. The method of claim 1, wherein the generating of the prediction video comprises generating the prediction video for the enhancement layer video by applying a bi-cubic interpolation to a chrominance component of the base layer video and applying the convolution filter of the deep neural network to a luminance component of the base layer video.

3. The method of claim 1, wherein the deep neural network is a deep neural network trained on the basis of a difference between video scaled up from low-resolution luminance input video and high-resolution original video.

4. The method of claim 1, wherein the deep neural network comprises a plurality of residual blocks in which two convolution layers and two activation functions are alternately connected.

5. The method of claim 4, wherein the activation functions comprise leaky rectified linear units (LReLUs).

6. The method of claim 1, wherein the deep neural network comprises a pixel shuffle layer.

7. A non-transitory computer-readable recording medium recording thereon a program for executing the method of claim 1 in a computer.

8. An apparatus for performing scalable video decoding, the apparatus comprising:
a controller configured to generate base layer video by down-sampling input video, generate prediction video for enhancement layer video by selectively applying a fixed up-scaling filter, which has fixed filter coefficient values, and a convolution filter of a deep neural network to the base layer video, and code the base layer video and the prediction video, wherein the controller is configured to generate the prediction video for the enhancement layer video by applying one convolution filter corresponding to a compression and distortion degree of the generated base layer video to the base layer video among a plurality of convolution filters of a plurality of deep neural networks which are pre-trained according to a plurality of compression and distortion degrees.

9. The apparatus of claim 8, wherein the controller generates the prediction video for the enhancement layer video by applying a bi-cubic interpolation to a chrominance component of the base layer video and applying the convolution filter of the deep neural network to a luminance component of the base layer video.

10. The apparatus of claim 8, wherein the deep neural network is a deep neural network trained on the basis of a difference between video scaled up from low-resolution luminance input video and high-resolution original video.

11. The apparatus of claim 8, wherein the deep neural network comprises a plurality of residual blocks in which two convolution layers and two activation functions are alternately connected.

12. The apparatus of claim 11, wherein the activation functions comprise leaky rectified linear units (LReLUs).

13. The apparatus of claim 8, wherein the deep neural network comprises a pixel shuffle layer.

* * * * *